United States Patent
Kim et al.

(10) Patent No.: US 12,482,805 B2
(45) Date of Patent: Nov. 25, 2025

(54) ELECTRODE FOR SECONDARY BATTERY AND METHOD OF MANUFACTURING THE SAME

(71) Applicant: LG Energy Solution, Ltd., Seoul (KR)

(72) Inventors: Myeongseong Kim, Daejeon (KR); Soohyun Kim, Daejeon (KR); Kihyun Kim, Daejeon (KR); Yunjung Kim, Daejeon (KR); Dojoong Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 542 days.

(21) Appl. No.: 17/921,498

(22) PCT Filed: Oct. 1, 2021

(86) PCT No.: PCT/KR2021/013490
§ 371 (c)(1),
(2) Date: Oct. 26, 2022

(87) PCT Pub. No.: WO2022/085984
PCT Pub. Date: Apr. 28, 2022

(65) Prior Publication Data
US 2023/0163270 A1   May 25, 2023

(30) Foreign Application Priority Data
Oct. 20, 2020 (KR) .......... 10-2020-0136314

(51) Int. Cl.
*H01M 10/052* (2010.01)
*H01M 4/134* (2010.01)
(Continued)

(52) U.S. Cl.
CPC ......... *H01M 4/1395* (2013.01); *H01M 4/134* (2013.01); *H01M 4/623* (2013.01)

(58) Field of Classification Search
None
See application file for complete search history.

(56) References Cited

U.S. PATENT DOCUMENTS

| | | | |
|---|---|---|---|
| 2002/0086213 A1* | 7/2002 | Utsugi | H01M 4/13 429/231.95 |
| 2005/0175894 A1 | 8/2005 | Visco et al. | |

(Continued)

FOREIGN PATENT DOCUMENTS

| | | | | |
|---|---|---|---|---|
| CN | 109037627 | * | 12/2018 | ............ H01M 10/05 |
| CN | 109671908 A | * | 4/2019 | .......... H01M 4/1397 |

(Continued)

OTHER PUBLICATIONS

English translation of CN 114242946 (Year: 2022).*

(Continued)

*Primary Examiner* — Yoshitoshi Takeuchi
(74) *Attorney, Agent, or Firm* — Bryan Cave Leighton Paisner LLP

(57) ABSTRACT

A method of manufacturing an electrode for secondary battery is provided. The method includes melting lithium at a first temperature to produce a first melt; stirring a metal fluoride powder together with the first melt at a second temperature to produce a second melt; and producing a lithium alloy electrode with the second melt, wherein the lithium alloy electrode includes lithium fluoride.

9 Claims, 3 Drawing Sheets

(51) Int. Cl.
*H01M 4/1395* (2010.01)
*H01M 4/62* (2006.01)

(56) References Cited

U.S. PATENT DOCUMENTS

| | | |
|---|---|---|
| 2006/0109999 A1 | 5/2006 | Van Halteren |
| 2007/0006680 A1 | 1/2007 | Dover et al. |
| 2010/0024597 A1 | 2/2010 | Dover et al. |
| 2015/0357628 A1 | 12/2015 | Li et al. |
| 2016/0164103 A1 | 6/2016 | Son et al. |
| 2019/0097239 A1 | 3/2019 | Son et al. |
| 2019/0140257 A1 | 5/2019 | Chae et al. |
| 2020/0365887 A1 | 11/2020 | Zaghib et al. |
| 2022/0166022 A1 | 5/2022 | Paolella et al. |

FOREIGN PATENT DOCUMENTS

| | | | | |
|---|---|---|---|---|
| CN | 109037627 B | | 8/2020 | |
| CN | 113871597 A | * | 12/2021 | ........ H01M 10/0525 |
| CN | 114242946 A | * | 3/2022 | .............. H01M 4/58 |
| JP | H04315775 | | 11/1992 | |
| JP | H07302617 | | 11/1995 | |
| JP | H08250108 | | 9/1996 | |
| JP | 3812324 B2 | | 8/2006 | |
| JP | 2007524204 | | 8/2007 | |
| JP | 5461463 B2 | | 4/2014 | |
| JP | 2018163754 | | 10/2018 | |
| JP | 2022528304 | | 6/2022 | |
| KR | 10-2008-0023703 A | | 3/2008 | |
| KR | 10-2015-0016091 A | | 2/2015 | |
| KR | 10-1914532 B1 | | 11/2018 | |
| KR | 10-2088478 B1 | | 3/2020 | |
| KR | 10-2020-0041332 A | | 4/2020 | |
| KR | 10-2020-0081305 A | | 7/2020 | |
| WO | 2020-034036 A1 | | 2/2020 | |
| WO | 2020206531 | | 10/2020 | |

OTHER PUBLICATIONS

English translation of CN 113871597 (Year: 2021).*
English translation of CN-109671908 (Year: 2019).*
English translation of CN 109037627 (Year: 2018).*
Wang et al. "Ultrahigh-current density anodes with interconnected Li metal reservoir through overlithiation of mesoporous ALF3 framework," Sci. Adv. 2017; 3:e1701301, Sep. 2017.
Ling-Long Kong et al., "Lithium-Magnesium Alloy as a Stable Anode for Lithium-Sulfur Battery", Adv. Functional Materials (2019), 29, 1808756.

* cited by examiner

[FIG. 1]
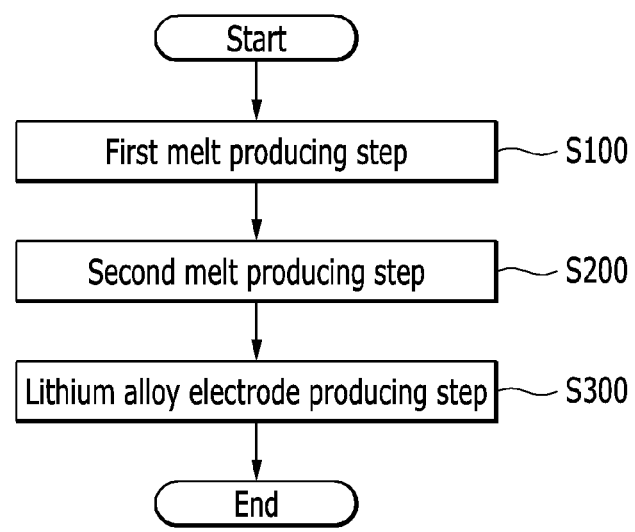

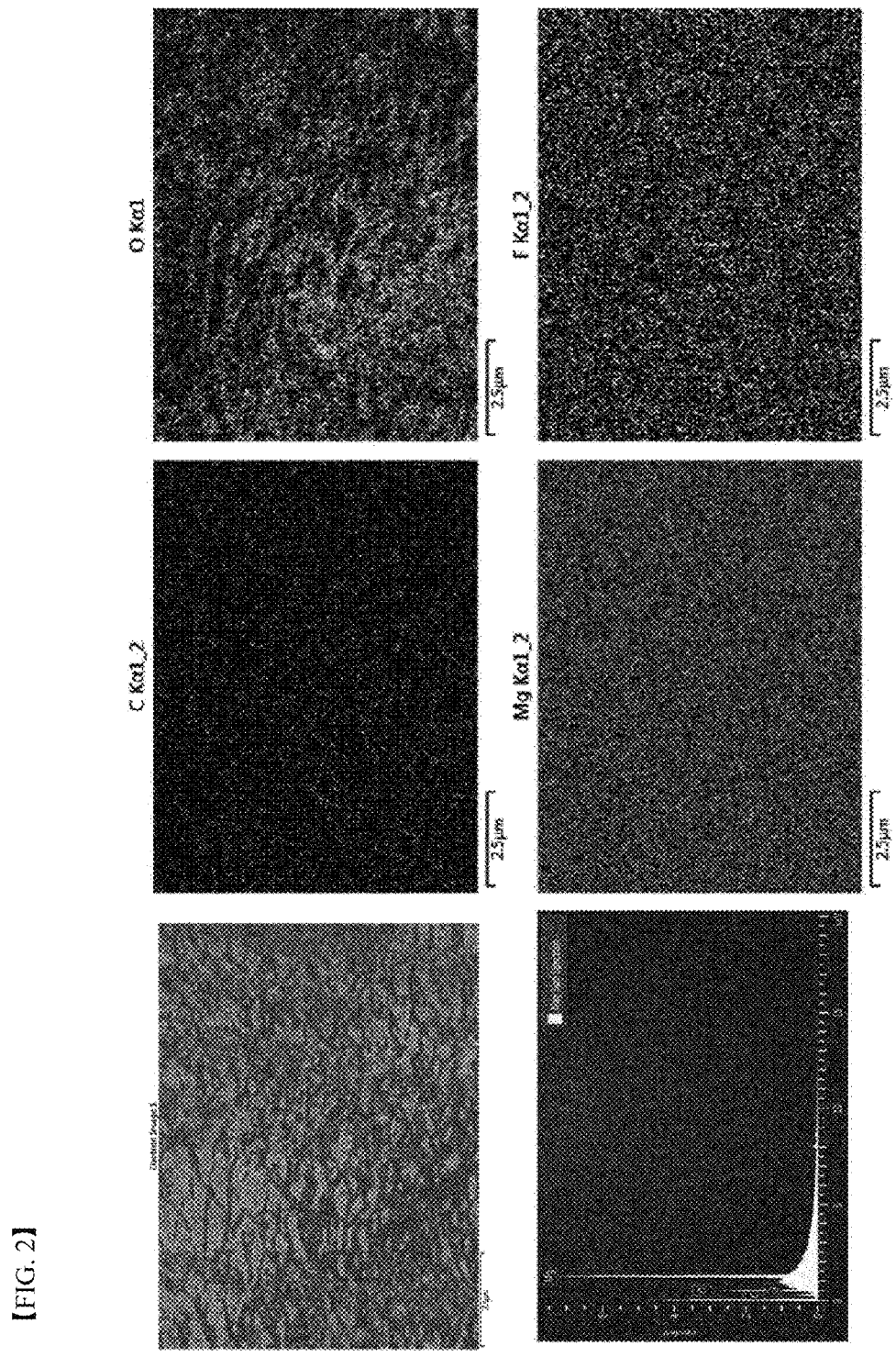
[FIG. 2]

[FIG. 3]
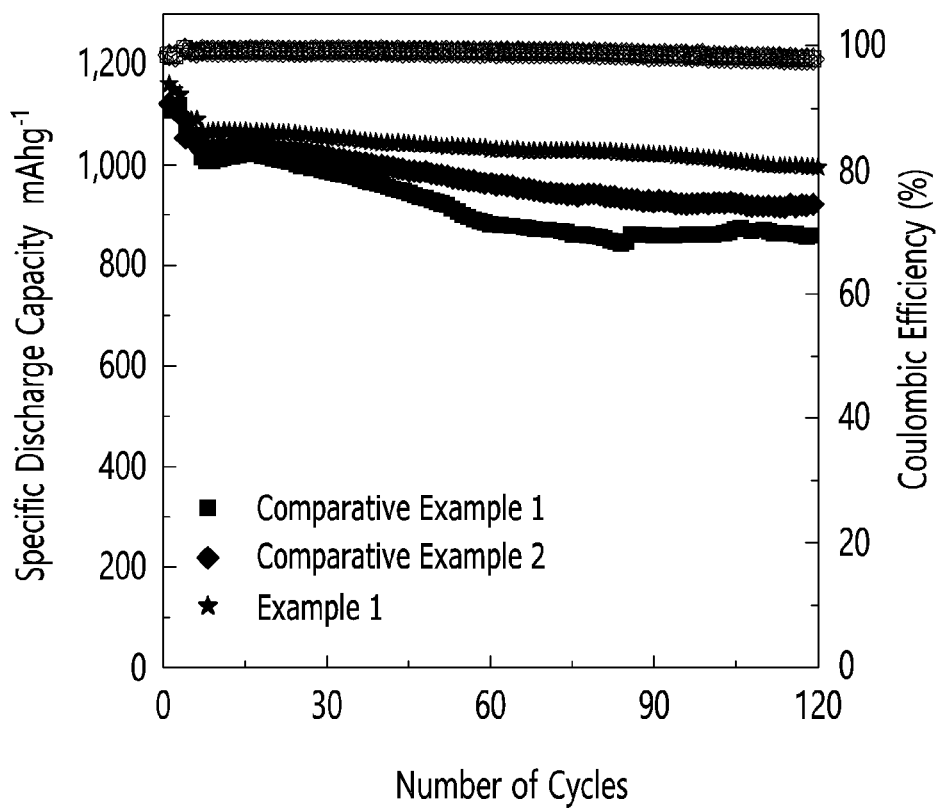

ELECTRODE FOR SECONDARY BATTERY AND METHOD OF MANUFACTURING THE SAME

CROSS CITATION WITH RELATED APPLICATION(S)

This application is a National Stage Application of International Application No. PCT/KR2021/013490, filed on Oct. 1, 2021, which claims the benefit of and priority of Korean Patent Application No. 10-2020-0136314 filed on Oct. 20, 2020, the disclosures of which are incorporated herein by reference in their entirety.

FIELD

The present disclosure relates to an electrode for secondary battery and a method of manufacturing the electrode for secondary battery, and more particularly to an electrode for secondary battery having improved battery performance and life characteristics and a method of manufacturing the electrode for secondary battery.

BACKGROUND

Along with the technology development and increased demand for mobile devices, demand for secondary batteries as energy sources has been increasing rapidly. Among these secondary batteries, a lithium secondary battery having high energy density and a high voltage, a long cycle lifespan, and a low self-discharge rate is commercially available and widely used.

The lithium secondary battery has a structure in which an electrode assembly including a positive electrode, a negative electrode, and a separator interposed between the positive electrode and the negative electrode is stacked or wound, and is configured by incorporating this electrode assembly in a battery case and injecting an electrolyte solution into the battery case. The lithium secondary battery generates electrical energy by oxidation and reduction reactions when lithium ions intercalates/de-intercalates from the positive electrode and the negative electrode.

Conventionally, a lithium (Li) electrode has been used as the negative electrode to improve the energy density of a lithium ion battery. Here, the lithium electrode is an electrode made of lithium (Li) metal. However, in the case of a lithium electrode, problems such as formation of lithium dendrite and making the lithium electrode porous due to repeated charging and discharging of the lithium ion battery have occurred. Problems such as dendrite formation causes an internal short circuit in the secondary battery, increases leakage current, and may cause failure or damage to the secondary battery, or, in the worst case, it may cause a fire, and the life characteristics of the lithium secondary battery may also be deteriorated.

Recently, a lithium alloy electrode has been used as the negative electrode. Here, the lithium alloy electrode is an electrode made of a lithium magnesium alloy (Li/Mg alloy) comprising lithium (Li) and magnesium (Mg). At this time, a surface oxide film (native layer) of $LiO_2$, $Li_2CO_3$, LiOH, etc. was formed on the surface of the lithium alloy electrode, so that the life characteristics of the lithium secondary battery were further improved. However, the lithium alloy electrode also causes a volume change due to non-uniform plating/stripping of lithium during continuous charging and discharging, and the surface oxide film formed on the lithium alloy electrode is destroyed, which causes problems such as side reactions and dendrite formation due to the reaction with the electrolyte.

Therefore, in order to use lithium as a negative electrode, there is a growing need to solve the above-mentioned problems and further improve the life characteristics.

SUMMARY

It is an object of the present disclosure to provide an electrode for secondary battery having improved battery performance and life characteristics and a method of manufacturing the electrode for secondary battery.

The objects of the present disclosure are not limited to the aforementioned objects, and other objects which are not described herein should be clearly understood by those skilled in the art from the following detailed description and the accompanying drawings.

According to one aspect of the present disclosure, there is provided a method of manufacturing an electrode for secondary battery, the method comprising the steps of:

melting lithium (Li) at a first temperature to produce a first melt; stirring a metal fluoride powder together with the first melt at a second temperature to produce a second melt; and producing a lithium alloy electrode with the second melt, wherein the lithium alloy electrode comprises lithium fluoride (LiF).

The metal fluoride powder may be contained in an amount of 1 wt % or more and 30 wt % or less based on the total weight of the second melt.

The metal contained in the metal fluoride powder may include any one of silicon (Si), magnesium (Mg), zinc (Zn), aluminum (Al), tin (Sn), strontium (Sr), lanthanum (La), silver (Ag), indium (In), tantalum (Ta), and niobium (Nb).

The metal contained in the metal fluoride powder may be magnesium (Mg).

The metal fluoride powder may be contained in an amount of 1 wt % or more and 10 wt % or less based on the total weight of the second melt.

The lithium alloy electrode may be manufactured in the form of a foil.

The first temperature may be 200 degrees Celsius or more and 500 degrees Celsius or less, and the second temperature may be 200 degrees Celsius or more and 500 degrees Celsius or less.

The second temperature may be equal to or higher than the first temperature.

The lithium alloy electrode may be produced by extruding and rolling a lithium alloy ingot, the lithium alloy ingot being formed by cooling the second melt.

According to another aspect of the present disclosure, there is provided a secondary battery comprising: a lithium alloy negative electrode made of a lithium alloy comprising lithium fluoride (LiF); a positive electrode comprising a current collector to which the positive electrode slurry composition is applied; and a separator interposed between the lithium alloy negative electrode and the positive electrode, wherein the lithium alloy is produced from a melt in which lithium (Li) and a metal fluoride powder are melted.

The metal fluoride powder may be contained in an amount of 1 wt % or more and 30 wt % or less based on the total weight of the melt.

A metal contained in the metal fluoride powder may include any one of silicon (Si), magnesium (Mg), zinc (Zn), aluminum (Al), tin (Sn), strontium (Sr), lanthanum (La), silver (Ag), indium (In), tantalum (Ta), and niobium (Nb).

According to embodiments of the present disclosure, an electrode for secondary battery having improved battery performance and life characteristics can be provided.

The effects of the present disclosure are not limited to the effects mentioned above and additional other effects not described above will be clearly understood from the description of the appended claims by those skilled in the art.

BRIEF DESCRIPTION OF DRAWINGS

FIG. 1 is a flowchart schematically showing a method of manufacturing an electrode for a secondary battery according to an embodiment of the present disclosure;

FIG. 2 shows an EDS mapping result for an electrode manufactured by the method of manufacturing an electrode for a secondary battery of FIG. 1; and FIG. 3 is a graph showing results of electrochemical characteristic evaluation of Examples and Comparative Examples.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, throughout the specification, when a portion is referred to as "including" a certain component, it means that the portion can further include other components, without excluding the other components, unless otherwise stated.

FIG. 1 is a flowchart schematically showing a method of manufacturing an electrode for a secondary battery according to an embodiment of the present disclosure.

The method of manufacturing an electrode for a secondary battery according to an embodiment of the present disclosure is a method of manufacturing a lithium alloy electrode. Here, in the lithium alloy electrode, the "lithium alloy" may mean an alloy composed of a lithium (Li) metal and a different type of metal (M). That is, the lithium alloy electrode may be an electrode made of a lithium alloy.

Referring to FIG. 1, the method for manufacturing a secondary battery according to an embodiment of the present disclosure includes an electrode first melt producing step S100, a second melt producing step S200, and a lithium alloy electrode producing step S300.

Referring to FIG. 1, the first melt producing step S100 may be a step of producing a first melt in which lithium (Li) is melted.

Here, the first melt may be produced by melting lithium (Li) at a first temperature. More specifically, the first melt can be produced by melting lithium (Li) at a temperature of 200 degrees Celsius or more and 500 degrees Celsius or less. More preferably, the first melt can be produced by melting lithium (Li) at a temperature of 250 degrees Celsius or more and 450 degrees Celsius or less. As one example, the first melt can be produced by melting lithium (Li) at a temperature of 300 degrees Celsius or more and 400 degrees Celsius or less. When the first melt producing step S100 is performed at a temperature that satisfies the above-mentioned range, lithium (Li) may be uniformly melted in the first melt. When the first melt producing step S100 is performed at a temperature of less than 200 degrees Celsius, lithium (Li) may not be sufficiently melted in the first melt. When the first melt producing step S100 is performed at a temperature of more than 500 degrees Celsius, the temperature of the first melt is too high, which may cause problems such as a risk of fire in the process.

Referring to FIG. 1, the second melt producing step S200 may be a step of producing a second melt by stirring a metal fluoride ($MF_x$) powder together with the first melt.

Further, the second melt can be produced by stirring the first melt and the metal fluoride powder, through a reaction as shown in the following Equation 1.

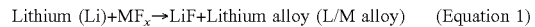

Lithium (Li)+$MF_x$→LiF+Lithium alloy (L/M alloy)　　(Equation 1)

Thereby, a lithium alloy (Li/M alloy) and lithium fluoride (LiF) can be formed in the second melt. That is, the lithium alloy can be formed by reacting the metal (M) contained in the metal fluoride ($MF_x$) powder with the lithium (Li). Further, the lithium fluoride (LiF) may be formed by reacting the lithium (Li) with fluoride ions ($F^-$) contained in the metal fluoride ($MF_x$) powder.

Here, the lithium alloy forms lithium fluoride (LiF) on the surface thereof, so that the surface of the lithium alloy can be protected, and the growth of lithium dendrites can be suppressed. Further, lithium fluoride (LiF) has excellent conductivity, and can also improve the battery performance of the lithium alloy.

Here, the metal (M) contained in the metal fluoride ($MF_x$) powder may include any one of silicon (Si), magnesium (Mg), zinc (Zn), aluminum (Al), tin (Sn), strontium (Sr), lanthanum (La), silver (Ag), indium (In), tantalum (Ta), and niobium (Nb). As one example, the metal (M) contained in the metal fluoride ($MF_x$) powder may be magnesium (Mg). Further, in the metal fluoride ($MF_x$) powder, x differs depending on the type of metal (M), wherein x may be 0.1 or more and 7.9 or less. More preferably, x may be 1 or more and 5 or less.

Further, the first melt can be contained in an amount of 70 wt % or more and 99 wt % or less based on the total weight of the second melt. More preferably, the first melt can be contained in an amount of 80 wt % or more and 99 wt % or less based on the total weight of the second melt. As one example, the first melt can be contained in an amount of 90 wt % or more and 99 wt % or less based on the total weight of the second melt.

Further, the metal fluoride ($MF_x$) powder can be contained in an amount of 1 wt % or more and 30 wt % or less based on the total weight of the second melt. More preferably, the metal fluoride ($MF_x$) powder can be contained in an amount of 1 wt % or more and 20 wt % or less based on the total weight of the second melt. As one example, the metal fluoride ($MF_x$) powder can be contained in an amount of 1 wt % or more and 10 wt % or less based on the total weight of the second melt.

That is, the second melt may include the first melt and the metal fluoride powder ($MF_x$) in a weight ratio of 70 wt % to 99 wt %:1 wt % to 30 wt %.

Here, when the second melt producing step S200 is performed at a weight ratio that satisfies the above-mentioned range, the first melt and the metal fluoride ($MF_x$) powder can be uniformly melted in the second melt. When the second melt producing step S200 is performed at a weight ratio outside the above-mentioned range, lithium fluoride (LiF) is not sufficiently formed, or the first melt and the metal fluoride ($MF_x$) powder are not well stirred, and thus the lithium alloy may not be sufficiently formed.

Further, the second melt can be produced by stirring the first melt and metal fluoride ($MF_x$) powder at a second temperature. Further, the second temperature may be the same as the first temperature or may be higher than the first temperature.

More specifically, the second melt can be produced by stirring the first melt and metal fluoride ($MF_x$) powder at a temperature of 200 degrees Celsius or more and 500 degrees Celsius or less. More preferably, the second melt can be produced by stirring the first melt and metal fluoride ($MF_x$) powder at a temperature of 250 degrees Celsius or more and 450 degrees Celsius or less. As one example, the second melt can be produced by stirring the first melt and metal fluoride ($MF_x$) powder at a temperature of 300 degrees Celsius or more and 400 degrees Celsius or less.

When the second melt producing step S200 is performed at a temperature that satisfies the above-mentioned range, the first melt and the metal fluoride ($MF_x$) powder can be uniformly stirred in the second melt. When the second melt producing step S200 is performed at a temperature of less than 200 degrees Celsius, the first melt and the metal fluoride ($MF_x$) powder cannot be sufficiently stirred in the second melt. When the second melt producing step S200 is performed at a temperature of more than 500 degrees Celsius, the process cost and time required for cooling the second melt may increase, and the temperature of the second melt may be too high, which may cause problems such as a risk of fire in the process.

Referring to FIG. 1, the lithium alloy electrode producing step S300 may be a step of producing a lithium alloy electrode using the second melt. The lithium alloy electrode may include lithium fluoride (LiF).

Further, the step S300 can be a step of producing a lithium alloy electrode by extruding and rolling a lithium alloy ingot, the lithium alloy ingot being formed by cooling the second melt. As one example, the lithium alloy electrode can be manufactured in the form of a foil.

For the steps of extruding and rolling, known extrusion process and rolling process can be performed without particular limitation in the present disclosure. As one example, for the rolling step, the lithium alloy ingot can be passed between rotating rolls or performed using a flat plate press.

Thereby, the lithium alloy electrode produced in the lithium alloy electrode producing step S300 can have the effect of improving the surface protection performance of the lithium alloy and suppressing the growth of lithium dendrites because the lithium alloy electrode contains lithium fluoride (LiF). Thereby, in the method for manufacturing an electrode for secondary battery according to an embodiment of the present disclosure, an electrode for secondary battery having improved battery performance and life characteristics can be manufactured.

Next, the negative electrode for secondary battery and the secondary battery including the negative electrode according to the embodiment of the present disclosure will be described.

The secondary battery according to another embodiment of the present disclosure may include the above-mentioned electrode for secondary battery as a negative electrode. More specifically, the secondary battery may include an electrode assembly including the lithium alloy electrode as a negative electrode, a positive electrode, and a separator interposed between the negative electrode and the positive electrode, and an electrolyte.

The positive electrode can be manufactured by applying a positive electrode slurry including a positive electrode active material, a binder, a conductive material, and the like to a positive electrode current collector.

The positive electrode can be manufacture in a form in which a positive electrode slurry containing a positive electrode active material is applied onto a positive electrode current collector, and the positive electrode slurry may further include the conductive material and binder as described above together with the positive electrode active material. As one example, a sulfur electrode may be used as the positive electrode.

The positive electrode active material may include, for example, a layered compound such as lithium nickel oxide ($LiNiO_2$), or a compound substituted with one or more transition metals; lithium manganese oxides such as chemical formulae $Li_{1+x}Mn_{2-x}O_4$ (where x is 0 or more and 0.33 or less), $LiMnO_3$, $LiMn_2O_3$, $LiMnO_2$; lithium copper oxide ($Li_2CuO_2$) vanadium oxides such as $LiV_3O_8$, $LiV_3O_4$, $V_2O_5$, and $Cu_2V_2O_7$; a Ni-site type lithium nickel oxide represented by chemical formula $LiNi_{1-x}M_xO_2$ (where M is Co, Mn, Al, Cu, Fe, Mg, B or Ga, and x is 0.01 or more and 0.3 or less); lithium manganese composite oxide represented by chemical formula $LiMn_{2-x}M_xO_2$ (where M is Co, Ni, Fe, Cr, Zn or Ta, and x is 0.01 or more and 0.1 or less) or $Li_2Mn_3MO_8$ (where M is Fe, Co, Ni, Cu or Zn); lithium manganese composite oxide with spinel structure represented by $LiNi_xMn_{2-x}O_4$; $LiMn_2O_4$ in which a part of Li in chemical formula is substituted with an alkaline earth metal ion; a disulfide compound; $Fe_2(MoO_4)_3$, and the like, without being limited thereto.

Further, the positive electrode active material may include, for example, a sulfur-carbon composite (S/C). Here, the sulfur-carbon composite (S/C) may include a sulfur material and a carbon material in a ratio of 75 parts by weight:25 parts by weight. However, the positive electrode active material is not limited thereto, and known positive electrode active materials may be used.

Further, the conductive material is used to impart conductivity to the electrode, and the conductive material can be used without particular limitation as long as it has electronic conductivity without causing chemical changes in the battery to be configured. Specific examples thereof include carbon-based materials such as carbon black, acetylene black, ketjen black, channel black, furnace black, lamp black, thermal black, and carbon fiber, and these may be used either singly or as a mixture of two or more. As one example, as the conductive material, Denka Black, which is a type of acetylene black, can be used.

The binder performs the role of improving adhesion between negative electrode active material particles and an adhesive force between the negative electrode active material and the current collector. Specific examples thereof include polyvinylidene fluoride (PVDF), vinylidenefluoride-hexafluoropropylene copolymer (PVDF-co-HFP), polyvinyl alcohol, polyacrylonitrile, carboxymethylcellulose (CMC), starch, hydroxypropyl cellulose, regenerated cellulose, polyvinylpyrrolidone, tetrafluoroethylene, polyethylene, polypropylene, ethylene-propylene-diene polymer (EPDM), sulfonated-EPDM, styrene butadiene rubber (SBR), fluororubber, or various copolymers thereof, and these may be used either singly or as a mixture of two or more. As one example, the binder may be used by mixing styrene butadiene rubber (SBR) and carboxymethyl cellulose (CMC).

The positive electrode current collector is not particularly limited as long as it has conductivity without causing chemical changes to the battery. For example, stainless steel, aluminum, nickel, titanium, calcined carbon, aluminum or stainless steel having a surface treated with carbon, nickel, titanium, silver, etc. can be used. As one example, the positive electrode current collector may be an aluminum current collector.

The separator separates the negative electrode and the positive electrode, and provides a passage for lithium ions to move. Any separator may be used without particular limitation as long as it is generally used as a separator in a lithium secondary battery. Particularly, a separator having excellent moisture-retention ability for an electrolyte while having low resistance to the migration of electrolyte ions is preferable. Specifically, a porous polymer film, for example, a porous polymer film made of polyolefin-based polymers such as ethylene homopolymer, propylene homopolymer, ethylene/butene copolymer, ethylene/hexene copolymer, and ethylene/methacrylate copolymer, or a laminated structure of two or more layers thereof may be used. As one example, the separator may be a polyethylene porous film.

In addition, the electrolyte used herein may include an organic liquid electrolyte, an inorganic liquid electrolyte, a solid polymer electrolyte, a gel type polymer electrolyte, a solid inorganic electrolyte, a molten inorganic electrolyte or the like which can be used in the production of a lithium secondary battery, but is not limited thereto. As one example, as the electrolyte, a mixed solution of lithium bis(trifluoromethanesulfonyl)imide (LiTFSI) and lithium nitrate ($LiNO_3$) in an organic solvent containing 1,3-dioxolane and dimethyl ether can be used.

Hereinafter, the contents of the present disclosure will be described by way of examples. However, the following examples are for illustrative purposes only, and the scope of the present disclosure is not limited thereto.

Example: Manufacturing Method of Li—Mg Alloy Negative Electrode 97 wt % of lithium was melted at 500 degrees Celsius to produce a first melt. 3 wt % of $MgF_2$ powder was added to the produced lithium melt, and the mixture was stirred while maintaining 500 degrees Celsius. Then, the stirred melt was cooled to prepare a lithium magnesium alloy ingot containing lithium fluoride (LiF). The prepared lithium magnesium alloy ingot was extruded and rolled to manufacture a negative electrode in the form of a foil.

Comparative Example 1: Manufacturing Method of Li Negative Electrode

A lithium metal ingot was subjected to extrusion and rolling to manufacture a negative electrode in the form of a foil.

Comparative Example 2: Manufacturing Method of Li—Mg Negative Electrode

A negative electrode was manufactured in the same manner as in Example, except that 3 wt % of magnesium (Mg) powder was added to the lithium metal melt produced in Example, and the produced lithium magnesium alloy ingot did not contain lithium fluoride (LiF).

Experimental Example 1: EDS Mapping Result

EDS (Energy Dispersive X-ray Spectrometer) analysis was performed on the negative electrode produced in Example, and the results are shown in FIG. 2.

Referring to FIG. 2, it can be confirmed that magnesium (Mg) and fluorine (F) were uniformly distributed on the surface of the negative electrode produced in Example. In addition, it can be confirmed that carbon (C) and oxygen (O) were distributed on the surface of the negative electrode produced in Example. However, carbon (C) and oxygen (O) are components observed on the surface of conventional lithium.

Thereby, it can be confirmed that magnesium (Mg) as a lithium magnesium alloy was distributed on the surface of the negative electrode manufactured as in Example, and fluorine (F) was formed as lithium fluoride (LiF) on the surface of the lithium alloy.

Experimental Example 2: Evaluation of Life Characteristics 90 parts by weight of a sulfur-carbon composite (S/C 75:25 parts by weight) as a positive electrode active material, 5 parts by weight of Denka Black as a conductive material, and 5 parts by weight of styrene-butadiene rubber/carboxymethylcellulose (SBR/CMC 7:3) as a binder were mixed to prepare a positive electrode slurry composition. The prepared positive electrode slurry composition was applied onto an aluminum current collector, and dried at 50 degrees Celsius for 12 hours, and pressed with a roll press device to manufacture a positive electrode.

Here, as the separator, a polyethylene porous film of 20 μm having a porosity of 68% was prepared.

Here, as the electrolyte, a mixture, in which lithium bis(trifluoromethanesulfonyl)imide (LiTFSI) at a concentration of 1M and 1 wt % of lithium nitrate ($LiNO_3$) were mixed in an organic solvent containing 1,3-dioxolane and dimethyl ether (1:1 volume ratio), was prepared.

The produced positive electrode and each negative electrode produced in Example 1, Comparative Example 1, and Comparative Example 2 were prepared, the prepared separator was interposed between the positive electrode and the negative electrode, and secondary batteries were respectively prepared using 0.1 ml of the prepared electrolyte.

The evaluation results of the life characteristics of each secondary battery are shown in FIG. 3 and Table 1.

TABLE 1

| | Capacity retention rate (%) relative to the 7th cycle (@120 cycles) |
|---|---|
| Comparative Example 1 | 85.1% |
| Comparative Example 2 | 89.5% |
| Example 1 | 93.7% |

Referring to FIG. 3 and Table 1, it can be confirmed that Example shows a high capacity retention rate, unlike Comparative Examples 1 and 2. Thereby, it can be confirmed that in the case of Example, lithium fluoride (LiF) was formed on the surface of the negative electrode, and as the surface of the negative electrode was protected, the life characteristics are excellent.

Although the invention has been shown and described above with reference to the preferred embodiments, the scope of the present disclosure is not limited thereto, and numerous other modifications and improvements can be devised by those skilled in the art using the basic principles of the invention defined in the appended claims, which also falls under the spirit and scope of the present disclosure.

The invention claimed is:

1. A method of manufacturing an electrode for secondary battery, the method comprising:

melting lithium (Li) at a first temperature to produce a first melt;

stirring a metal fluoride powder together with the first melt at a second temperature to produce a second melt; and producing a lithium alloy electrode with the second melt, wherein the lithium alloy electrode comprises lithium fluoride (LiF).

2. The method according to claim 1, wherein the metal fluoride powder is contained in an amount of 1 wt % or more and 30 wt % or less based on the total weight of the second melt.

3. The method according to claim 1, wherein a metal contained in the metal fluoride powder comprises any one selected from the group consisting of silicon (Si), magnesium (Mg), zinc (Zn), aluminum (Al), tin (Sn), strontium (Sr), lanthanum (La), silver (Ag), indium (In), tantalum (Ta), and niobium (Nb).

4. The method according to claim 3, wherein the metal contained in the metal fluoride powder is magnesium (Mg).

5. The method according to claim 4, wherein the metal fluoride powder is contained in an amount of 1 wt % or more and 10 wt % or less based on the total weight of the second melt.

6. The method according to claim 1, wherein the lithium alloy electrode is manufactured in the form of a foil.

7. The method according to claim 1, wherein the first temperature is 200 degrees Celsius or more and 500 degrees Celsius or less, and the second temperature is 200 degrees Celsius or more and 500 degrees Celsius or less.

8. The method according to claim 7, wherein the second temperature is equal to or higher than the first temperature.

9. The method according to claim 1, wherein the lithium alloy electrode is produced by extruding and rolling a lithium alloy ingot, the lithium alloy ingot being formed by cooling the second melt.

* * * * *